United States Patent
Fitzgerald et al.

[15] 3,649,241
[45] Mar. 14, 1972

[54] 1-(P-CUMYL)-3,3-DIMETHYLUREAS AS SELECTIVE HERBICIDE

[72] Inventors: David J. Fitzgerald, Wilmington, Del.; Edward J. Soboczenski, Chadds Ford, Pa.

[73] Assignee: E. I. du Pont de Nemours and Company, Wilmington, Del.

[22] Filed: July 22, 1969

[21] Appl. No.: 843,795

[52] U.S. Cl. ................................71/120, 71/66, 71/DIG. 1
[51] Int. Cl. .................................................A01n 9/20
[58] Field of Search.....................................71/120

[56] References Cited

UNITED STATES PATENTS 2,655,447  10/1953  Todd .......................................71/120

Primary Examiner—James O. Thomas, Jr.
Attorney—Norbert F. Reinert

[57] ABSTRACT

This invention relates to the use of 1-(p-cumyl)-3,3-dimethylurea for the control of undesired vegetation in rice.

4 Claims, No Drawings

1-(P-CUMYL)-3,3-DIMETHYLUREAS AS SELECTIVE HERBICIDE

BACKGROUND OF INVENTION 1-(p-cumyl)-3,3-dimethylurea is disclosed in U.S. Pat. No. 2,655,447 and is referred to therein as having herbicidal properties. No indication is made, however, that this compound is useful for the selective control of weeds in rice.

SUMMARY OF INVENTION

In accordance with the present invention, it has been found that 1-(p-cumyl)-3,3-dimethylurea is an excellent selective herbicide for use in rice. Quite surprisingly, it can be used safely for either the pre- or postemergent control of weeds in rice.

DETAILED DESCRIPTION OF INVENTION 1-(p-cumyl)-3,3dimethylurea can be used in the method of the invention either singly or in combination with other herbicides which are safe for use on rice such as, for example, 3,4-dichloropropionanilide or hexahydrothiol-1-azepinecarboxylic acid, ethyl ester.

As indicated above, 1-(p-cumyl)-3,3-dimethylurea can be applied either pre- or post-emergence to the rice and weeds. When applied preemergence rates of ¾ to 2 kg./ha. are preferred although rates of ½ to 4 kg./ha. may be used depending upon the soil type, height and variety of weeds, amount of rainfall, temperature, etc. When applied postemergence slightly lower rates give comparable weed control.

Weeds which are controlled by the method of the invention include, but are not limited to, species such as: barnyard grass, Echionochloa crusgalli; foxtail, Setaria spp.; teaweed, Sida spp.; red teaweed, Melochia corchorifloria; crabgrass, Digitaria spp.; curly indigo, Aeschynomene virginica; dallis grass, Paspalum dilitatum; Mexican weed, Caperonia castaneaefolia; pigweed, Amaranthus retroflexus; Colorado grass, Panicum texanum; goose grass, Eleusine indica; jungle rice, Echinochloa colonum; and duck salad, Heteranthera spp.

1-(p-cumyl)-3,3-dimethylurea can be prepared by reacting 4-isopropylaniline with dimethylcarbamyl chloride in the presence of a base or alternatively, by the reaction of 4-isopropylaniline with phosgene to give 4-isopropylphenyl isocyanate and reaction of the latter with dimethylamine.

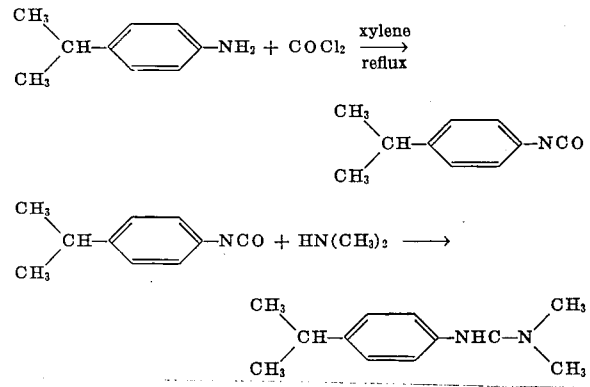

The following example illustrates this reaction:

EXAMPLE 1

To a mixture of 110 parts of phosgene and 500 parts of xylene is added a mixture of 135 parts of 4-isopropylaniline and 150 parts of xylene over a half-hour period. The reaction mixture is refluxed under a dry-ice condenser for 2 hours, under a water condenser for 1 hour, and then sparged with nitrogen to remove the last traces of HCl. The reaction mixture is then cooled to room temperature and 50 parts of dimethylamine are added. The reaction mixture is refluxed for 15 minutes, cooled, and the resulting solids collected by filtration. A total of 187 parts of white solids are obtained, m.p. 157°–159° C.

1-(p-cumyl)-3,3-dimethylurea can be prepared for use in this invention by formulating it with adjuvants according to conventional practice. A preferred adjuvant for use with the active compound is one or more surface-active agents.

The surface-active agent used in this invention can be a wetting, dispersing or an emulsifying agent which will assist dispersion of the compound. The surface-active agent or surfactant can include such anionic, cationic and nonionic agents as have heretofore been generally employed in plant control compositions of similar type. Suitable surface-active agents are set forth in "Detergents and Emulsifiers Annual" (1969) by John W. McCutcheon, Inc.

Illustrations of surface-active agents suitable for use are: polyethylene glycol fatty acid esters and fatty alkylol amide condensates, alkylaryl sulfonates, fatty alcohol sulfates, dialkyl esters of sodium sulfosuccinate, fatty acid esters of sodium isethionate, polyoxyethylene ethers and thioethers and long chain quaternary ammonium chloride compounds.

Surface-active dispersing agents such as sodium or calcium lignin sulfonates, low-viscosity methyl cellulose, polymerized sodium salts of alkylnaphthalene sulfonic acids are also suitable.

Among the more preferred surfactants are the anionic and nonionic types. Among the anionic surface-active agents, preferred ones are alkali metal or amine salts of alkylbenzene sulfonic acids such as dodecylbenzene sulfonic acid, sodium lauryl sulfate, alkylnaphthalene sulfonates, sodium N-methyl-N-fatty acid taurates, oleic acid ester of sodium isethionate, dioctyl sodium sulfosuccinate, sodium dodecyldiphenyloxide disulfonate. Among the nonionic compounds, preferred members are alkylphenoxy poly(ethyleneoxy)ethanols such as nonylphenol adducts with ethylene oxide; trimethylnonyl polyethylene glycol ethers, polyethylene oxide adducts of fatty and rosin acids, long chain alkyl mercaptan adducts with ethylene oxide and polyethylene oxide adducts with sorbitan fatty acid esters.

In general, less than 10 percent by weight of the surface-active agents will be used in the formulation and ordinarily the amount of surface-active agents will range from 1–5 percent but may even be less than 1 percent by weight.

Additional surface-active agents can be added to the above formulation to increase the ratio of surface-active agent: active agent up to as high as 5:1 by weight. Normally the purpose of adding higher amounts of surfactant is to increase the growth retardant effect of the active compound. When used at higher rates it is preferred that the surfactant be present in the range of one-fifth to 5 parts surfactant for each 1 part of the active agent.

The formulation can contain, in addition to a surfactant, finely divided inert diluents such as talcs, natural clays, including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybean and cottonseed.

Preferred diluents are clays of hydrated aluminum silicate, hydrated aluminum magnesium silicate and hydrated aluminum magnesium iron silicate.

The amount of the finely divided inert solid diluent can vary widely but will generally range from 10 percent to 98 percent by weight of the composition. The particle size can vary considerably but will ordinarily be somewhat under 50 microns in the finished formulation. Such compositions are prepared by blending the ingredients and grinding in a hammer mill or an air attrition mill or similar device until uniform powders are obtained which have a particle size smaller than 50 microns. Compositions containing a surface-active agent and a solid inert diluent are preferably wettable powders containing from 25 to 90 percent of 1-(p-cumyl)-3,3-dimethylurea.

The active compound can also be formulated as a high strength composition in which the active ingredient may be present in amounts ranging from 90–99 percent. The remainder of the composition comprises surface-active agents, preferably in amounts of from 0.2 to 2 percent and diluents as described above. Such compositions are prepared by blending and grinding the ingredients to obtain a homogenous powder of fine particle size.

Compositions of the active compound and an inert solid diluent can also be formed into granules and pellets. In such compositions, the diluent will generally range from 65 to 99 percent and the active ingredient can range from 1 to 35 percent. It should be understood that it will not be necessary to include a surfactant in the granular and pelletized composition. To prepare granules the active compound can be dissolved in a solvent, and this solution can be sprayed over preformed clay granules, expanded vermiculite or the like while agitating the mixture to distribute the active ingredient over and throughout the granular mass. Such granules can range in particle size of from +60 mesh (0.25 mm.) to +10 mesh (2.00 mm.), and an active ingredient content of 1 to 6 percent is preferred. It is also possible to make such granules by mixing the finely divided diluent and finely divided active, for instance by grinding together, and then forming granules by adding water, tumbling and drying the resulting spheres.

Pellets can be prepared by extruding a mixture that comprises the active, pelleting clay diluent and water into strands, cutting these, and drying the product. Pellet size can range from 10 mesh to larger shapes such as ⅜-inch cubes. Also coarse dried extrusions can be dry granulated and screened to give any desired range of granule size. Pellets preferably contain from 5 to 35 percent of the active herbicide. In addition to the diluents, pelletized and granular compositions can contain additives such as binders, surfactants and the like.

In addition to the formulation described above, suspension concentrates can also be prepared. These formulations are prepared by wet milling the ingredients; i.e., ball milling or by sand grinding using the method described in Hochberg U.S. Pat. 2,581,414, issued Aug. 19, 1948, or Littler U.S. Pat. 3,060,084, issued Oct. 23, 1962. Using the methods described in these patents, fine particles of the active compound will be dispersed evenly in a diluent. Such compositions normally contain from 15 to 50 percent active ingredient and are characterized by having particles which are substantially less than 5–20 microns in diameter.

The following examples more fully illustrate the manner of formulating 1-(p-cumyl)-3,3-dimethylurea for use and use of the resulting formulations in accordance with the method of the present invention.

EXAMPLE 2

The following ingredients are blended, passed through a hammer mill to produce a particle size of essentially less than 150μ, and reblended.

| | |
|---|---|
| 1-(p-cumyl)-3,3-dimethylurea | 80.0% |
| Sodium alkylnaphthalenesulfonate | 2.0% |
| sodium lignin sulfonate | 2.0% |
| bentonite | 4.0% |
| fine silica | 2.5% |
| Kaolinite | 9.5% |

One kilogram (active) of this formulation is mixed with 500 liters of water in a spray tank fitted with an agitator. The 500 liters are sprayed over a one hectare area of rice which is infested with barnyard grass. The rice and barnyard grass are 4 to 8 centimeters in height, and are in the one- to two-leaf stage. Excellent control of the barnyard grass is obtained, and an excellent yield of rice is harvested.

EXAMPLE 3

One and one-quarter kilograms (active) of the formulation described in Example 2 above are mixed with 400 liters of water in a spray tank fitted with an agitator. The 400 liters of suspension are sprayed over a newly seeded hectare field of rice. Excellent control of barnyard grass, teaweed and crabgrass is obtained.

EXAMPLE 4

| | |
|---|---|
| 1-(p-cumyl)-3,3-dimethylurea | 10.0% |
| synthetic fine silica | 1.1% |
| trimethylnonyl alcohol condensed with 6 mols ethylene oxide | 8.0% |
| 15–30 mesh granular expanded vermiculite | 80.9% |

The active urea and fine silica are first blended together and micropulverized until the particles are substantially all below 20 microns. This dust is then blended briefly with the vermiculite and the surfactant is then sprayed upon the tumbling mass. The resulting granules are free from segregation of active from carrier in the dry state but the active will disperse into wet soil or water readily when wet.

This formulation is applied by airplane at the rate of 1¼ kg./ha. (active) to a field of newly seeded rice. Excellent control of barnyard grass, red teaweed, foxtails, curly indigo, duck salad, and seedling dallis grass is obtained.

EXAMPLE 5

| | |
|---|---|
| 1-(p-cumyl)-3,3-dimethylurea | 35.0% |
| Ca, mg. lignosulfonate | 15.0% |
| sodium pentachlophenate | 0.7% |
| sodium carbonate | 2.0% |
| hydrated attapulgite | 1.5% |
| water | 45.8% |

The above components are blended, then sand milled until the active is substantially all below 10μ. The resulting stable suspension dilutes readily with water to any desired use concentration or may be applied full strength in ultralow volume equipment.

Three-quarters kilogram (active) of the above formulation is diluted to 40 liters with water and applied by airplane mounted sprayer to a hectare of rice infested with teaweed and crabgrass. The rice and weeds are from 2 to 6 cm. tall at treatment. The rice is drained before treatment and the water is withheld for one week after treatment. Then the crop is flooded again. This treatment gives excellent control of the weeds present.

We claim:

1. A method for control of undesirable vegetation in rice comprising applying to the rice locus to be protected a herbicidally effective amount of 1-(p-cumyl)-3,3-dimethylurea.

2. The method of claim 1 wherein the application is a preemergence application.

3. The method of claim 1 wherein the application is a postemergence application.

4. The method of claim 1 wherein the rate of application of active herbicide is in the range of from ¾ to 2 kg./ha.

* * * * *

PO-1050
(5/69)

UNITED STATES PATENT OFFICE
CERTIFICATE OF CORRECTION

Patent No. 3,649,241      Dated March 14, 1972

Inventor(s) David J. Fitzgerald and Edward J. Soboczenski

It is certified that error appears in the above-identified patent and that said Letters Patent are hereby corrected as shown below:

The formula on page 1, line 60, appearing as

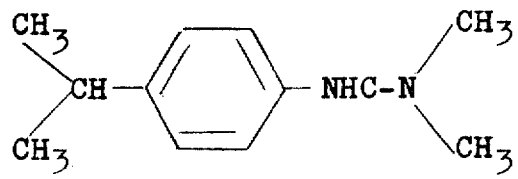

should be

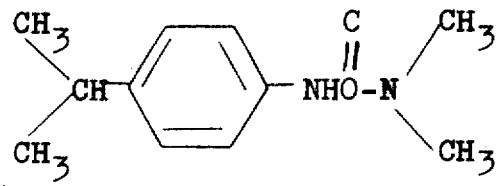

.

Signed and sealed this 19th day of November 1974.

(SEAL)
Attest:

McCOY M. GIBSON JR.        C. MARSHALL DANN
Attesting Officer          Commissioner of Patents